United States Patent
Gunji

(10) Patent No.: US 10,972,671 B2
(45) Date of Patent: Apr. 6, 2021

(54) IMAGE PROCESSING APPARATUS CONFIGURED TO GENERATE AUXILIARY IMAGE SHOWING LUMINANCE VALUE DISTRIBUTION, METHOD FOR CONTROLLING THE IMAGE PROCESSING APPARATUS, AND STORAGE MEDIUM

(71) Applicant: CANON KABUSHIKI KAISHA, Tokyo (JP)

(72) Inventor: Koichi Gunji, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 16/261,965

(22) Filed: Jan. 30, 2019

(65) Prior Publication Data
US 2019/0246043 A1   Aug. 8, 2019

(30) Foreign Application Priority Data
Feb. 7, 2018   (JP) .............................. JP2018-020346

(51) Int. Cl.
H04N 5/225   (2006.01)
H04N 5/232   (2006.01)
H04N 5/272   (2006.01)
H04N 5/235   (2006.01)

(52) U.S. Cl.
CPC ..... *H04N 5/232939* (2018.08); *H04N 5/2355* (2013.01); *H04N 5/23248* (2013.01); *H04N 5/272* (2013.01)

(58) Field of Classification Search
CPC . H04N 1/4074; H04N 5/2351; H04N 21/4854
See application file for complete search history.

(56) References Cited

U.S. PATENT DOCUMENTS

| 6,191,408 B1* | 2/2001 | Shinotsuka ............ H04N 3/155 250/208.1 |
| 2003/0016299 A1* | 1/2003 | Matsushima ........ H04N 5/2351 348/333.02 |
| 2004/0042791 A1* | 3/2004 | Suekane .............. H04N 5/2351 396/661 |

(Continued)

FOREIGN PATENT DOCUMENTS

JP   2009239637 A   10/2009

*Primary Examiner* — Twyler L Haskins
*Assistant Examiner* — Dwight Alex C Tejano
(74) *Attorney, Agent, or Firm* — Rossi, Kimms & McDowell LLP

(57) ABSTRACT

An image processing apparatus capable of making a user confirm effect of HDR reliably. An acquirer acquires a luminance component of an input image. A converter converts the luminance component acquired by the acquirer into a predetermined luminance value for each pixel. A generator generates a graph waveform image that shows a graph showing a distribution of the luminance values obtained through the conversion by the converter. A display controller displays the graph waveform image generated by the generator on a display unit. When the input image is recorded in a first mode, an axis representing the luminance values in the graph is a logarithmic axis, and the generator generates a logarithmic graph waveform image showing the distribution of the luminance values based on the logarithmic axis.

12 Claims, 11 Drawing Sheets

(56) References Cited

U.S. PATENT DOCUMENTS

| | | | | |
|---|---|---|---|---|
| 2004/0125220 | A1* | 7/2004 | Fukuda | H04N 5/23293 348/234 |
| 2005/0264683 | A1* | 12/2005 | Kamon | H04N 5/243 348/362 |
| 2007/0269132 | A1* | 11/2007 | Duan | G06T 5/40 382/274 |
| 2009/0128650 | A1* | 5/2009 | Takahashi | H04N 5/232 348/222.1 |
| 2012/0050565 | A1* | 3/2012 | Imai | H04N 9/735 348/224.1 |
| 2012/0105672 | A1* | 5/2012 | Doepke | H04N 5/2351 348/229.1 |
| 2014/0168486 | A1* | 6/2014 | Geiss | H04N 5/2353 348/294 |

* cited by examiner

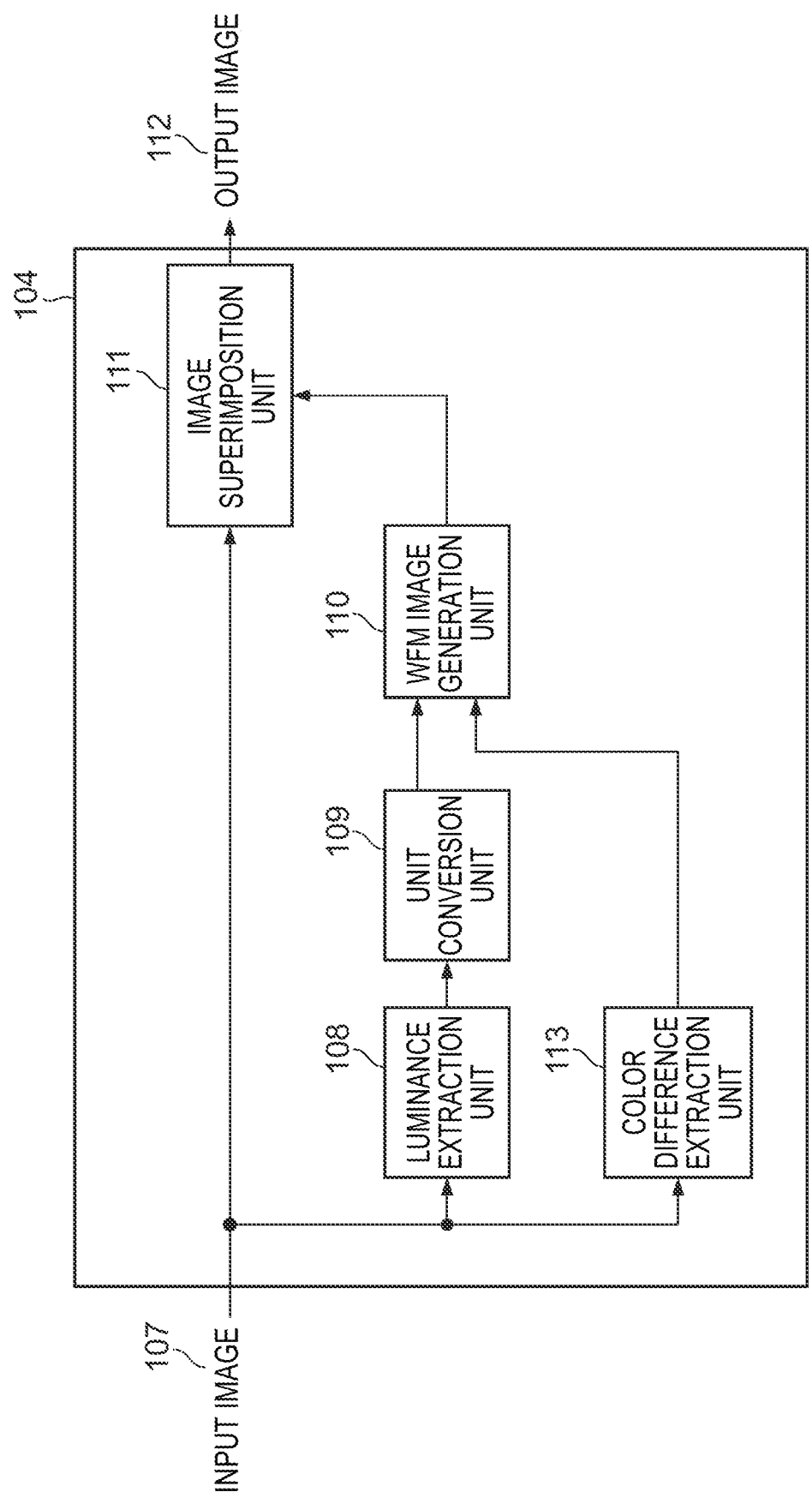

IMAGE PROCESSING APPARATUS CONFIGURED TO GENERATE AUXILIARY IMAGE SHOWING LUMINANCE VALUE DISTRIBUTION, METHOD FOR CONTROLLING THE IMAGE PROCESSING APPARATUS, AND STORAGE MEDIUM

BACKGROUND OF THE INVENTION

Field of the Invention

The present invention relates to an image processing apparatus configured to generate an auxiliary image used to adjust an exposure condition of an image pickup apparatus, a method for controlling the image processing apparatus, and a storage medium.

Description of the Related Art

For digital cameras and digital video cameras, settings of various image pickup parameters, such as focus, white balance, and exposure, are required when shooting is performed. Commonly used cameras have a function of automatically setting such image pickup parameters and allow users to perform shooting without consciousness of parameter settings.

On the other hand, in a case of pursuing video expression that cannot be obtained with the automatically set parameters and the like, the image pickup parameters need to be set manually, and therefore some cameras have an auxiliary function for manual settings.

A waveform monitor (waveform display; hereinafter, referred to as WFM) function is provided as an auxiliary setting function for exposure adjustment. The WFM function is a function of generating and displaying an auxiliary image in which signal levels of an image are expressed as a waveform graph (hereinafter, referred to as WFM image). When a WFM image is expressed by an XY axis graph, distributions of luminance component values and color difference component values of an image can be expressed, for example, with locations of pixels in a horizontal direction of the image represented by an X-axis, and signal levels represented by a Y-axis.

In recent years, large-sized display apparatuses such as TVs have wider ranges of expressible luminance, and digital cameras and digital video cameras also have wider shootable ranges of luminance (high dynamic range (HDR) imaging). On the other hand, a conventional range of luminance is referred to as standard dynamic range (hereinafter, referred to as SDR). Cameras are equipped with a display apparatus (small liquid crystal panel or the like) to allow an image to be checked when the image is shot. The HDR can express a 100 times wider range of luminance than the SDR, and it is therefore difficult to confirm the effect of the HDR over the SDR on a small-sized, low-cost display apparatus.

Accordingly, Japanese Laid-Open Patent Publication (Kokai) No. 2009-239637 discloses a technology in which a histogram is calculated by using an image that is shot at adjusted exposure (underexposure) so as to be darker than shot at suitable exposure and then is gained up by a gain amount to the exposure adjustment made to darken the image. In this technology, an image obtained by combining an image shot at the correct exposure and the calculated histogram is displayed on a display apparatus, whereby it can be confirmed that the range of shot luminance is wider, that is, the effect of the HDR can be confirmed.

However, according to the above-described technology of Japanese Laid-Open Patent Publication (Kokai) No. 2009-239637, a dark image is also unnecessarily shot.

SUMMARY OF THE INVENTION

Accordingly, the present invention provides an image processing apparatus comprising at least one processor and/or a circuit configured to function as an acquirer acquires a luminance component of an input image, a converter converts the luminance component acquired by the acquirer into a predetermined luminance value for each pixel, a generator generates a graph waveform image that shows a graph showing a distribution of the luminance values obtained through the conversion by the converter, and a display controller displays the graph waveform image generated by the generator on a display unit. When the input image is recorded in a first mode, an axis representing the luminance values in the graph is a logarithmic axis, and the generator generates a logarithmic graph waveform image showing the distribution of the luminance values based on the logarithmic axis.

Further features of the present invention will become apparent from the following description of exemplary embodiments (with reference to the attached drawings).

BRIEF DESCRIPTION OF THE DRAWINGS

FIG. 7 is a functional block diagram of a digital camera according to a third embodiment of the image processing apparatus of the present invention.

DESCRIPTION OF THE EMBODIMENTS

Figure 1A:
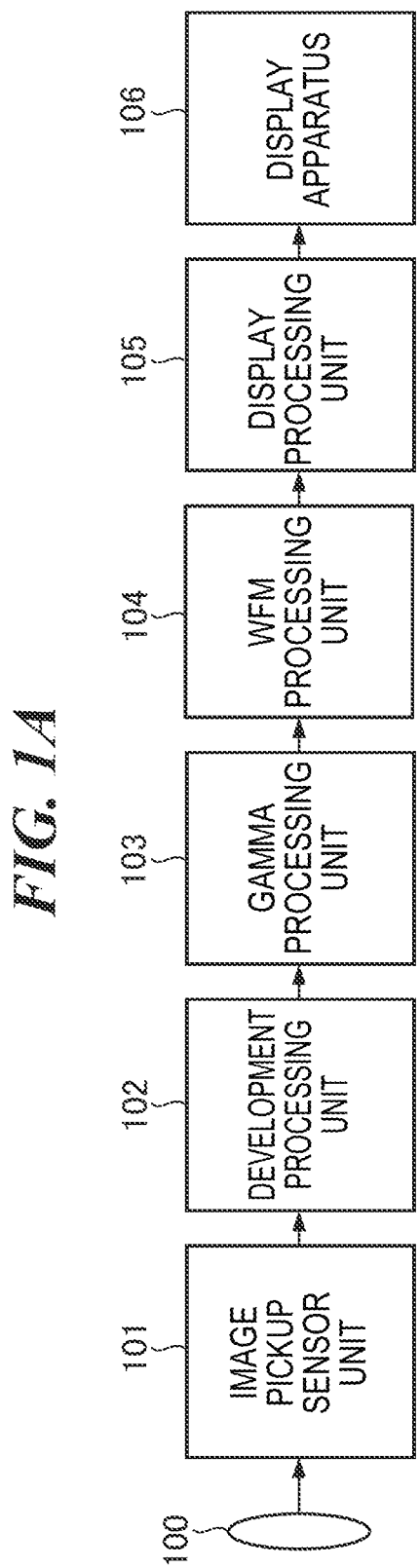
FIGS. 1A and 1B are functional block diagrams of a digital camera according to a first embodiment of an image processing apparatus of the present invention.
Figure 1B:
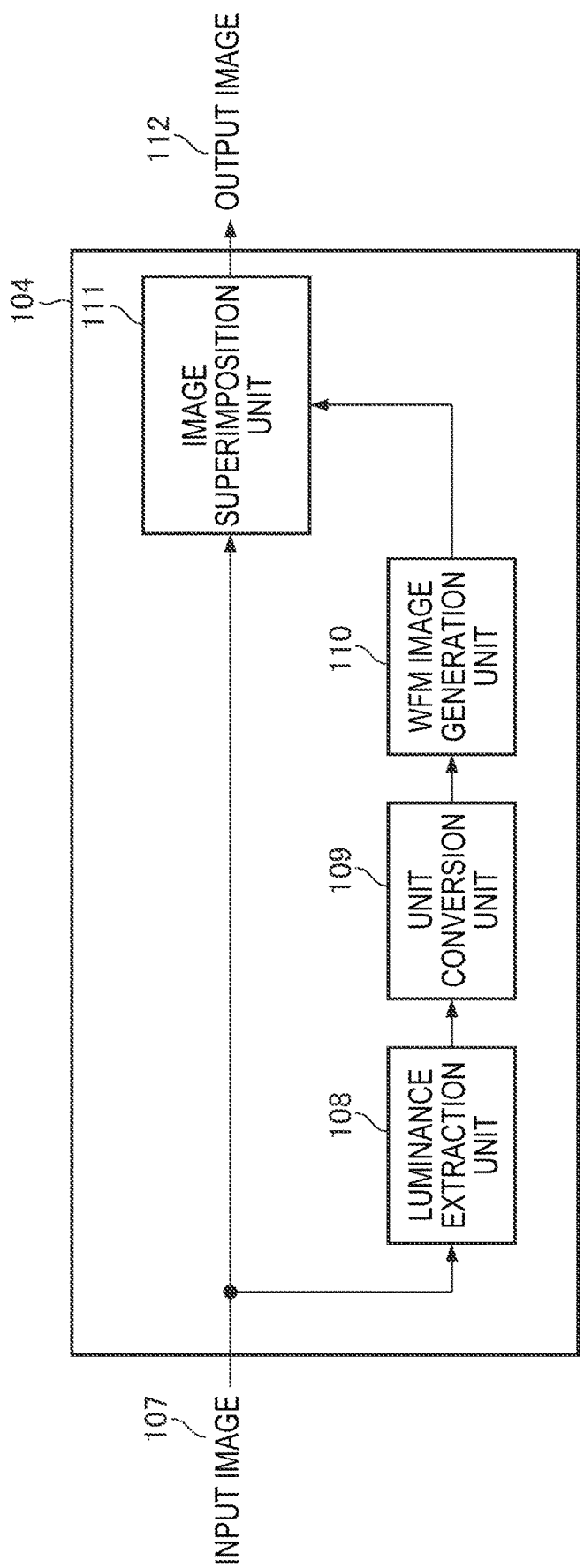

Hereinafter, each embodiment of the present invention will be described with reference to drawings. First, a first embodiment of the present invention will be described. FIG. 1A is a functional block diagram of a digital camera according to the first embodiment of an image processing apparatus of the present invention, and FIG. 1B is a functional block diagram showing details of a WFM processing unit 104 in FIG. 1A. In the present embodiment, a description will be given of a basic example of generation of a WFM image in a case where HDR (High Dynamic Range) shooting is performed by using a digital camera (hereinafter, referred to as camera).

In FIG. 1A, an image pickup sensor unit 101 includes an image pickup device such as a CCD sensor or a CMOS sensor. The image pickup sensor unit 101 performs optical-to-electrical conversion of an image formed through adjustment, by lenses 100, of an amount of incident light and focus, and further performs analog-to-digital conversion of the converted image to output a digital signal. The image pickup device has a mosaic-shaped pixel array structure in which R (red), G (green), and B (blue) color filters are arrayed in a predetermined arrangement, for example, every four pixels, which include one red pixel, one blue pixel, and two green pixels as a set, are regularly arranged. Such an arrangement of pixels is generally referred to as Bayer arrangement. The electrical signal obtained through the conversion by the image pickup sensor unit 101 is transmitted to a development processing unit 102 as Bayer image information.

Once the development processing unit 102 receives the Bayer image signal, it first converts the Bayer image signal, for each electrical signal of one pixel, into an RGB image signal, subsequently adjusts white balance of the RGB image signal through RGB offset adjustment and gain adjustment, and then transmits the RGB image signal to a gamma processing unit 103.

The gamma processing unit 103 carries out gamma correction processing and processing of converting the input RGB image signal into a luminance signal (Y) and color difference signals (Cb, Cr), and transmits the signals obtained through the processing to the WFM processing unit 104. In the gamma correction, characteristics of the image pickup sensor unit 101, the lenses 100, and the like are taken into consideration, and the processing is carried out based on the characteristics for generating a recorded image desired by a user of the camera. A recorded image that reproduces texture and gradation of a movie film and a recorded image to be displayed on a TV monitor can be generated by changing gamma correction values.

Moreover, as the gamma correction values are changed, a proportion of the input RGB image signal assigned for conversion to the luminance signal (Y) and a proportion of the input RGB image signal assigned for conversion to the color-difference signals (Cb, Cr) are changed. Accordingly, in HDR shooting, the gamma correction values are changed with consciousness of an HDR area and an SDR (Standard Dynamic Range) area.

Figure 2A:
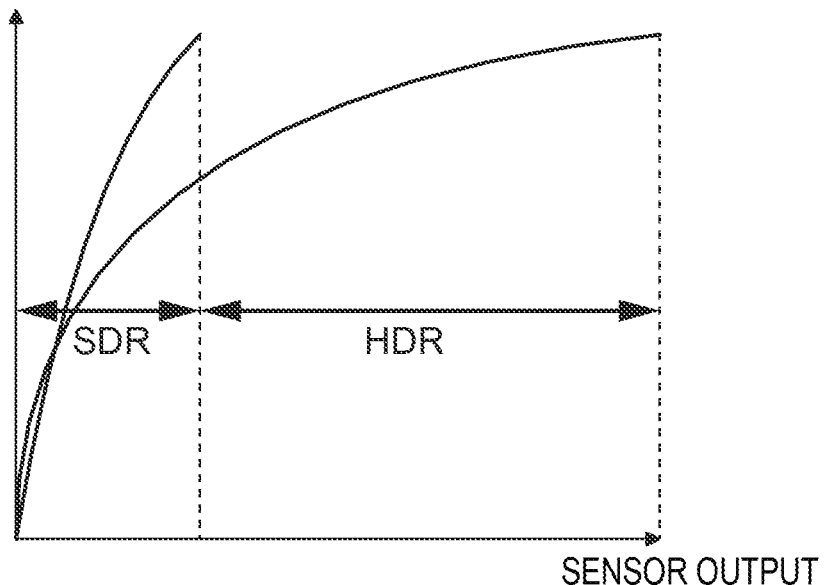
FIGS. 2A and 2B are graph diagrams showing relationships between an HDR area and an SDR area.
Figure 2B:
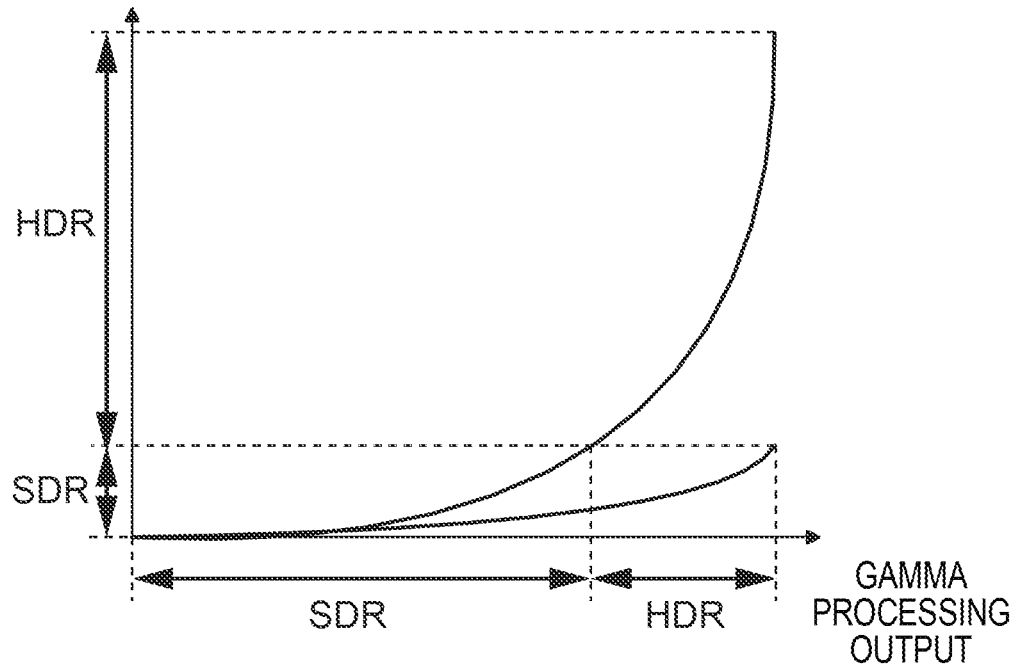

FIG. 2A is a graph diagram showing a relationship between the HDR area and the SDR area of pixel values after the image pickup device makes the outputs and the gamma processing is carried out, and FIG. 2B is a graph diagram showing a relationship between luminance values in the HDR area and luminance values in the SDR area. In FIG. 2A, a horizontal axis represents pixel values of the input RGB image signal, and a vertical axis represents pixel values of the YCbCr image signals output by the gamma processing unit 103.

The WFM processing unit 104 carries out processing of generating a WFM image and superimposing the WFM image on the input image. An input image 107 shown in FIG. 1B is the image output by the gamma processing unit 103. A luminance extraction unit 108 extracts a luminance component from the input image 107 and transmits a luminance signal to a unit conversion unit 109. The unit conversion unit 109 converts the value of the acquired luminance component into a luminance value expressed in cd/m$^2$ unit shown in FIG. 2B, or in any other unit of luminance such as lm/(sr*m$^2$) or nit, by using the gamma correction value information used by the gamma processing unit 103 to obtain luminance image information, and transmits the luminance image information to a WFM image generation unit 110.

The WFM image generation unit 110 generates a distribution graph image, which is information on a distribution of the luminance values, by summating the luminance image information. The distribution graph image is generated, with a vertical axis (Y-axis) representing the luminance values and a horizontal axis (X-axis) representing pixel locations in a horizontal direction of the image (see FIGS. 4B and 4C, which will be described later). Alternatively, the distribution graph image is generated, with the vertical axis (Y-axis) representing pixel locations in a vertical direction of the image and the horizontal axis (X-axis) representing the luminance values. The generated WFM image and the input image 107 are superimposed by an image superimposition unit 111 and are output as an output image 112.

A display processing unit 105 generates a synchronization signal for outputting the received image to a display apparatus 106 and outputs the synchronization signal along with the image. Common synchronization signals include an image horizontal direction synchronization signal, an image vertical direction synchronization signal, an effective image location synchronization signal, and the like. The display apparatus 106 is a display unit such as an EVF or a display that displays an image in accordance with a control signal generated by the display processing unit 105.

Figure 3:
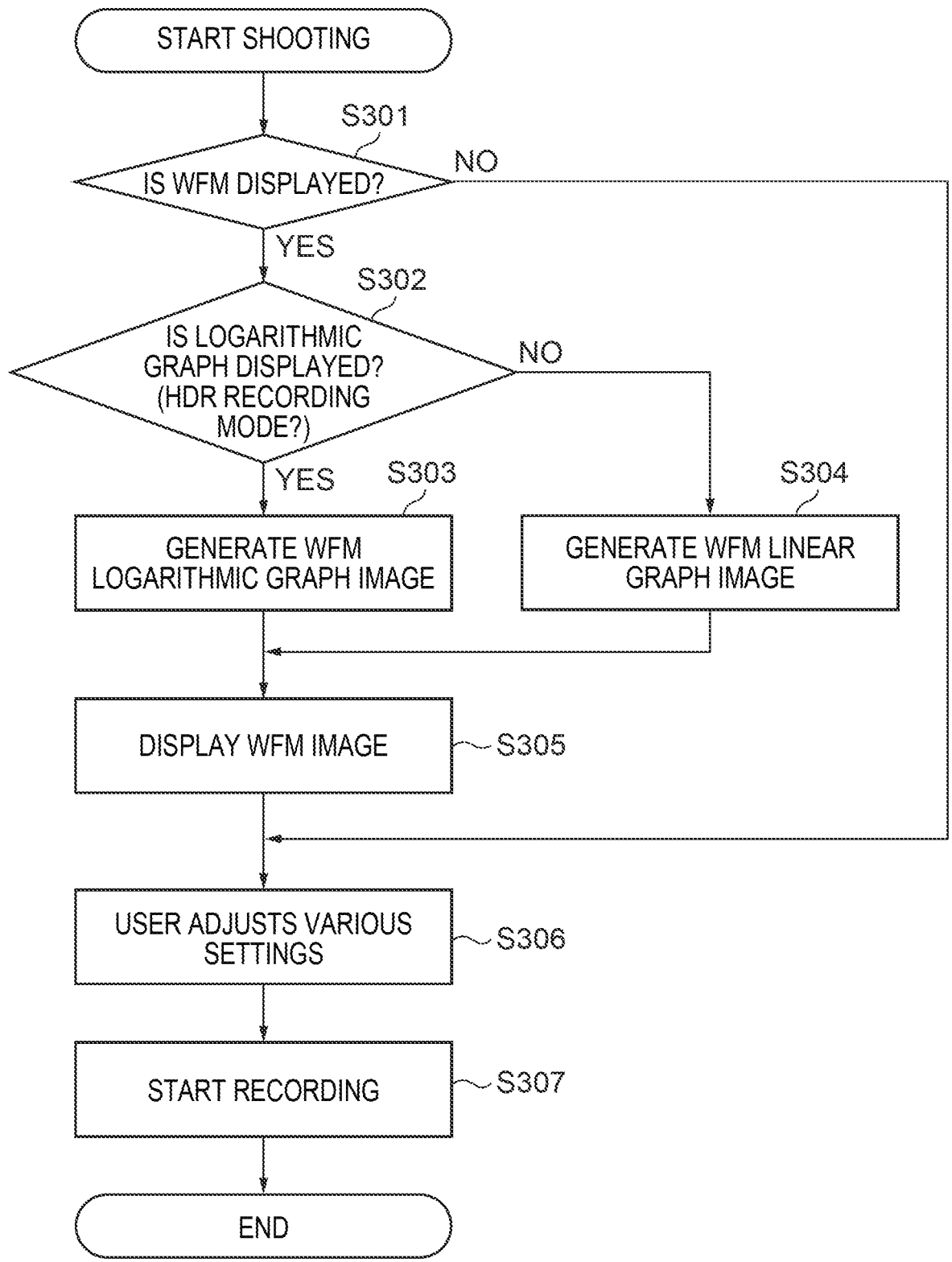
FIG. 3 is a flowchart showing operations of the digital camera.

Next, a description will be given of operations of the camera configured as described above, with reference to FIGS. 3 to 4F. FIG. 3 is a flowchart for describing the operations of the camera. Processing in each step in FIG. 3 is carried out in such a manner that a program stored in a ROM or the like included in a control circuit (not shown) of the camera is developed in a RAM and executed by a CPU or the like.

In FIG. 3, when shooting is started, in step S301 the control circuit chooses whether to display or not to display the WFM image, and proceeds to step S306 when the WFM image is not displayed, or proceeds to step S302 when the WFM image is displayed. In step S306, various settings for shooting by the user are adjusted, and then proceeds to step S307 and starts recording.

In step S302, the control circuit chooses either logarithmic graph display or linear graph display, for a method of displaying the WFM image. Conceivable methods of making a choice here are based on a user operation, selecting the logarithmic graph display when a recording mode of the camera is set in an HDR recording mode, or the like. The control circuit proceeds to step S303 when the logarithmic graph display is chosen, or proceeds to step S304 when the linear graph display is chosen.

Figure 4A:
FIGS. 4A to 4F are diagrams showing display examples of an input image and a WFM image in the first embodiment.
Figure 4B:
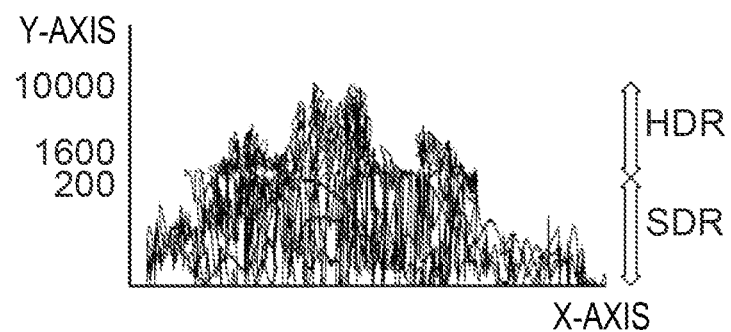
Figure 4C:
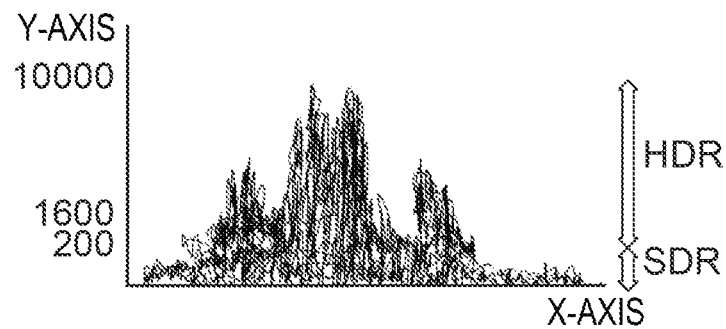

Here, FIG. 4A is a diagram showing an example of the input image and shows an image in which faces of two persons are brightly illuminated with candle lights on a cake in therebetween, against a dark backdrop. FIG. 4B shows an example of the WFM image generated from the input image of FIG. 4A and is a diagram in which both the HDR and SDR areas are expressed by a logarithmic graph (the vertical axis (Y-axis) is a logarithmic axis). FIG. 4C shows another example of the WFM image generated from the input image of FIG. 4A and is a diagram in which the vertical axis is a linear axis and both the HDR and SDR areas are expressed by a linear graph.

Figure 4D:
Figure 4E:
Figure 4F:

FIG. 4D shows a display example of the WFM image and is a diagram showing an image in which the input image of FIG. 4A and the WFM image of FIG. 4B are superimposed. FIG. 4E shows another display example of the WFM image and is a diagram showing an image in which the input image of FIG. 4A and the WFM image of FIG. 4C are superimposed. FIG. 4F shows still another display example of the WFM image and is a diagram showing an image in which the input image of FIG. 4A and the WFM image of FIG. 4B displayed with a different transmittance are superimposed.

In step S303, the control circuit generates a WFM logarithmic graph waveform image and proceeds to step S305. When an object is shot as shown in FIG. 4A, the WFM logarithmic graph waveform image is the one shown in FIG. 4B. In step S304, the control circuit generates a WFM linear graph waveform image and proceeds to step S305. When an object is shot as shown in FIG. 4A, the WFM linear graph waveform image is the one shown in FIG. 4C. It should be noted that in steps S303 and S304, each input image generates one WFM image.

In step S305, the control circuit displays the WFM image and the shot image in a superimposed manner and proceeds to step S306. When the logarithmic graph waveform image is generated, for example, the display image shown in FIG. 4D is displayed, and when the linear graph waveform image is generated, for example, the display image shown in FIG. 4E is displayed. When superimposing the images, it is possible to make the shot image diaphanous by varying transmittance of the WFM image as shown in the image of FIG. 4F. It is also possible that part of the generated WFM image is extracted to be displayed.

In step S306, the user adjusts the various settings for shooting, for example, makes exposure correction while having a look at the WFM image, and then the control circuit proceeds to step S307 and starts recording.

In general, an HDR image has a wider range of peak luminance (in the example of FIGS. 4A to 4F, a peak luminance of 10000 cd/m$^2$) than an SDR image. However, an object in an input image (in the example of FIGS. 4A to 4F, the two persons) is present, in many cases, within a luminance range of low luminance values compared to the peak luminance. In such cases, when the WFM linear graph waveform image as shown in FIG. 4C is generated, luminance values are unevenly distributed to be extremely dense at a lower side of the graph, and therefore a user can hardly grasp the distribution of the luminance values, thereby poor visibility of the graph in the WFM image.

As described above, the image processing apparatus according to the present embodiment generates a WFM logarithmic graph waveform image in which the vertical axis representing luminance values is the logarithmic axis, in a case of the HDR recording mode. More specifically, the vertical axis of a graph in a WFM image is configured to be the logarithmic axis, whereby the proportion of a low luminance area to an entire scale of the vertical axis is made large. That is, in the graph in the WFM image, the range of low luminance values is increased and emphasized. Thus, since the distribution of the luminance values in the low luminance area is spread to an upper side of the graph, it becomes easy to grasp the distribution of the luminance values, and visibility of the graph in the WFM image can be enhanced.

Next, a camera according to a second embodiment of the image processing apparatus of the present invention will be described with reference to FIGS. 4A to 6C. In the present embodiment, a description will be given of an example in which two or more WFM images are displayed when HDR shooting is performed by using the camera. It should be noted that overlapping parts with the above-described first embodiment will be described by utilizing the corresponding drawings.

Figure 5:
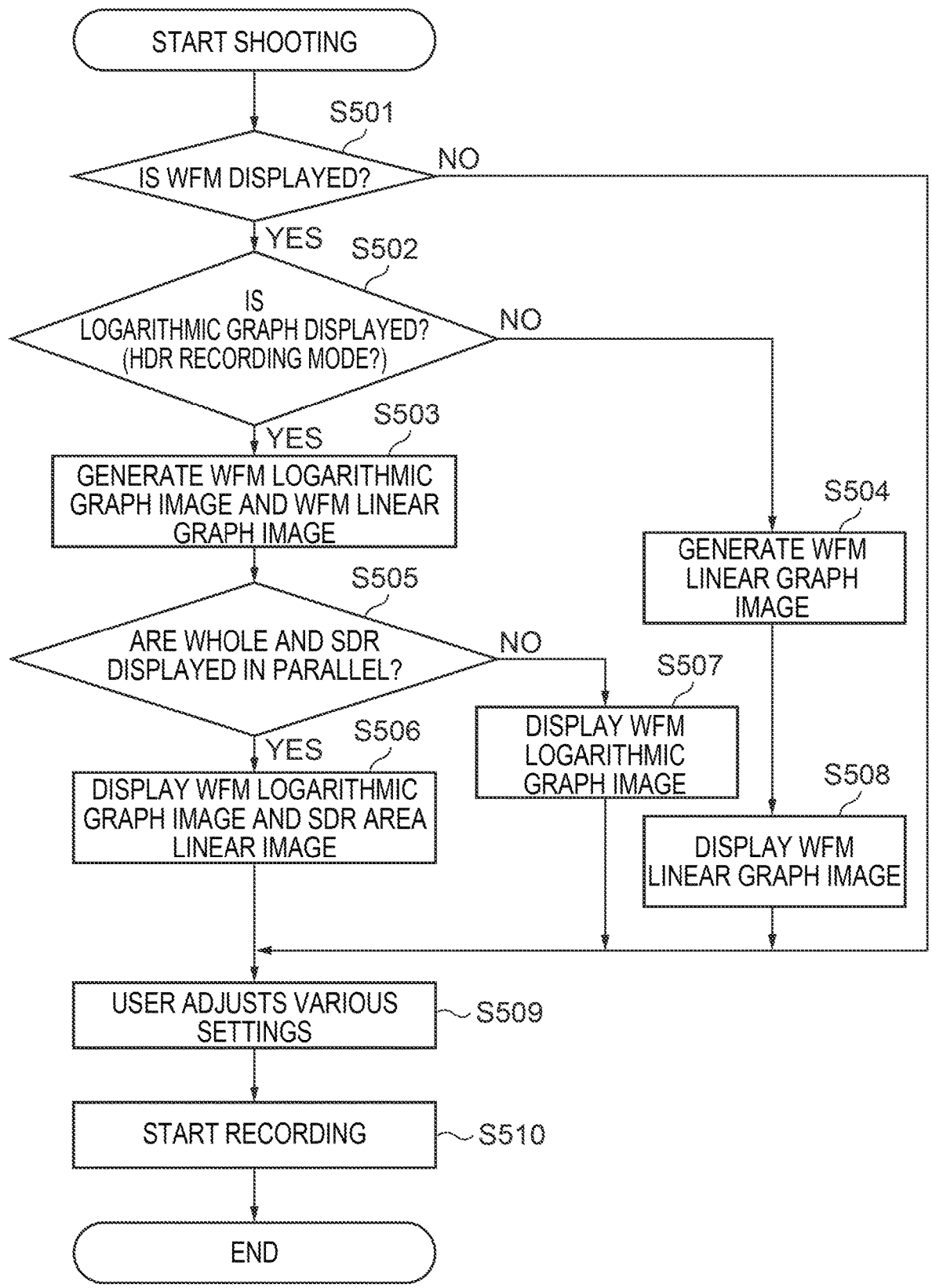
FIG. 5 is a flowchart showing operations of a digital camera according to a second embodiment of the image processing apparatus of the present invention.

FIG. 5 is a flowchart for describing operations of the camera. Each processing in FIG. 5 is carried out in such a manner that a program stored in a ROM or the like included in a control circuit (not shown) of the camera is developed in a RAM and executed by a CPU or the like.

In FIG. 5, when shooting is started, in step S501 the control circuit chooses whether to display or not to display a WFM image, and proceeds to step S509 when the WFM image is not displayed, or proceeds to step S502 when the WFM image is displayed. In step S509, various settings for shooting are adjusted by a user, and then the control circuit proceeds to step S510 and starts recording.

In step S502, the control circuit chooses either logarithmic graph display or linear graph display, for a method of displaying the WFM image. Conceivable methods of making a choice here are based on a user operation, selecting the logarithmic graph display when a recording mode of the camera is set in an HDR mode, or the like. The control circuit proceeds to step S503 when the logarithmic graph display is chosen, or proceeds to step S504 when the linear graph display is chosen.

In step S503, the control circuit generates a WFM logarithmic graph waveform image and a WFM linear graph waveform image and proceeds to step S505. When an object is shot as shown in FIG. 4A, the WFM logarithmic graph waveform image is the one shown in FIG. 4B. In step S504, the control circuit generates a WFM linear graph waveform image and proceeds to step S508, displays the WFM linear graph waveform image, and then proceeds to step S509. When an object is shot as shown in FIG. 4A, the WFM linear graph waveform image is the one shown in FIG. 4C. It should be noted that in step S503, one WFM logarithmic graph waveform image and one WFM linear graph waveform image are respectively generated for each one input image, and in step S504, one WFM linear graph waveform image is generated for each one input image.

In step S505, the control circuit chooses either to display only the logarithmic graph waveform image, or to display the whole logarithmic graph waveform image and the SDR area linear image in parallel. When the control circuit chooses to display only the logarithmic graph waveform image, in step S507 the control circuit displays, for example, the image of FIG. 4D in which the WFM image and the shot image are superimposed, and proceeds to step S509.

Figure 6A:
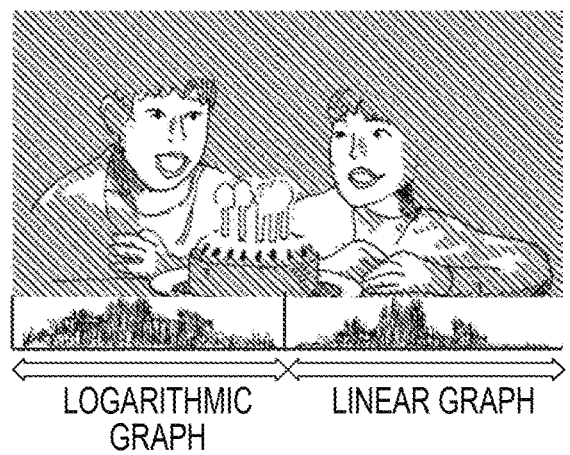
FIGS. 6A to 6C are diagrams showing display examples of an input image and WFM images in the second embodiment.
Figure 6B:
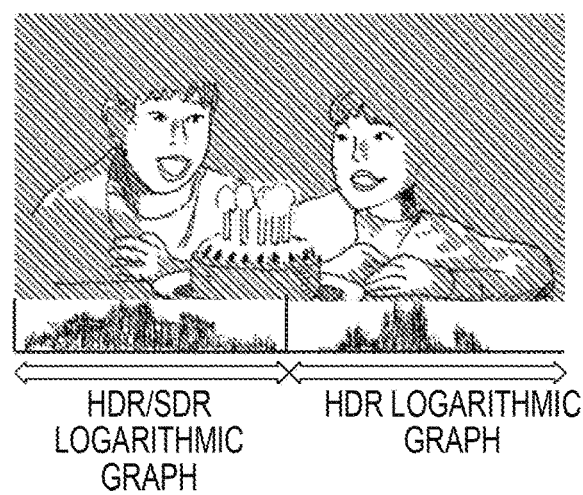
Figure 6C:
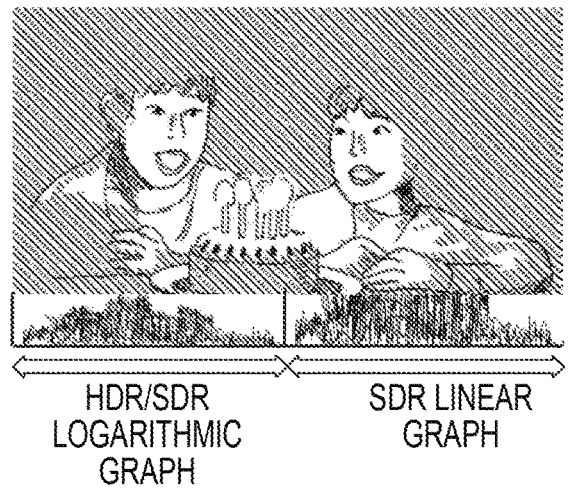

On the other hand, when the control circuit chooses to display the images in parallel, in step S506 the control circuit displays, for example, an image of FIG. 6A in which the WFM images and the shot image are superimposed, and proceeds to step S509. It should be noted that when superimposing the images, it is possible to make the shot image diaphanous by varying transmittance of the WFM image as shown in the image of FIG. 4F. Any two or more of the input images, the logarithmic graph waveform image, and the linear graph waveform image may be superimposed with controlled transmittance. Further, it is also possible that part of the generated WFM images is extracted so as to display an image as shown in FIG. 6B or 6C.

In step S509, the user adjusts the various settings for shooting, for example, makes exposure correction while having a look at the WFM image, and then the control circuit proceeds to step S510 and starts recording. The other configuration, operation, and functional effect are similar to the configuration, operation, and functional effect of the above-described first embodiment.

Next, a camera according to a third embodiment of the image processing apparatus of the present invention will be described with reference to FIGS. 7 to 9. In the present embodiment, a description will be given of an example in which a WFM image including a luminance component and color difference components is displayed when HDR shooting is performed by using the camera. It should be noted that overlapping parts with the above-described first embodiment will be described by utilizing the corresponding drawings.

FIG. 7 is a functional block diagram showing details of the WFM processing unit 104 in FIG. 1A. In the present embodiment, a color difference extraction unit 113 is added to the above-described first embodiment (FIG. 1B). The color difference extraction unit 113 extracts color difference components from the input image 107 and transmits a color difference signal to the WFM image generation unit 110.

Figure 8:
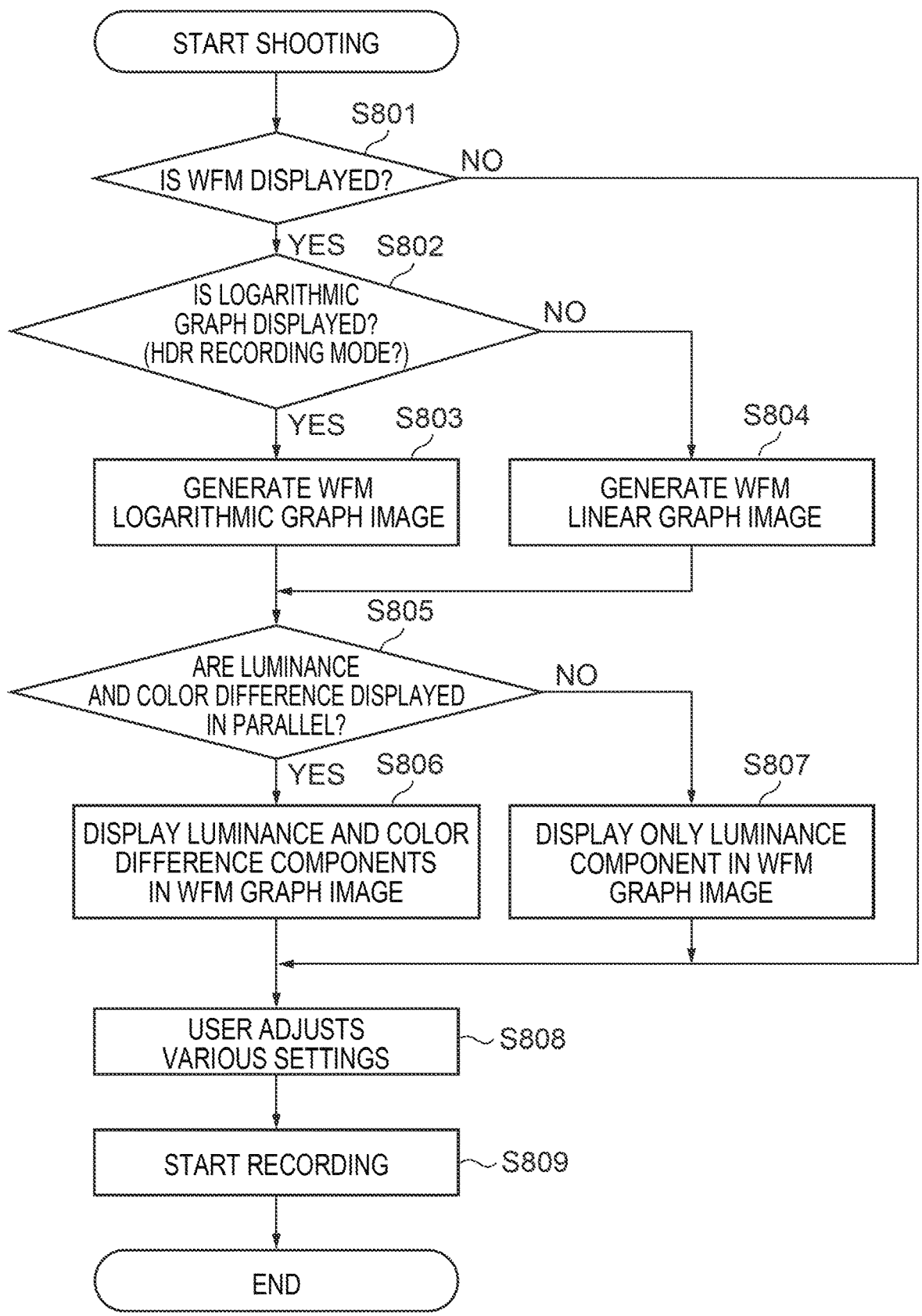
FIG. 8 is a flowchart showing operations of the digital camera.
Figure 9:
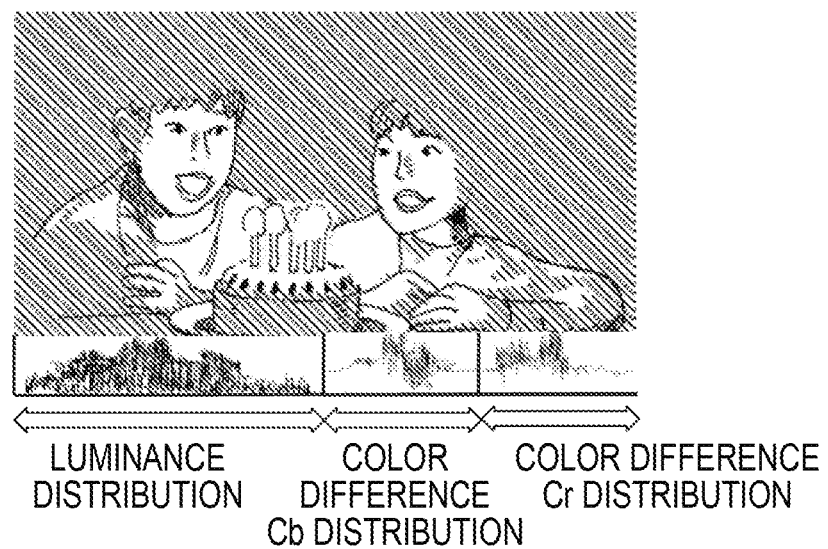
FIG. 9 is a diagram showing an example of an input image and WFM images displayed in step S806.

FIG. 8 is a flowchart for describing operations of the camera. Each processing in FIG. 8 is carried out in such a manner that a program stored in a ROM or the like included in a control circuit (not shown) of the camera is developed in a RAM and executed by a CPU or the like.

In FIG. 8, when shooting is started, in step S801 the control circuit chooses whether to display or not to display a WFM image, and proceeds to step S808 when the WFM image is not displayed, or proceeds to step S802 when the WFM image is displayed. In step S808, various settings for shooting are adjusted by a user, and then the control circuit proceeds to step S809 and starts recording.

In step S802, the control circuit chooses either logarithmic graph display or linear graph display, for a method of displaying the WFM image. Conceivable methods of making a choice here are based on a user operation, selecting the logarithmic graph display when a recording mode of the image pickup apparatus is set in an HDR mode, or the like. The control circuit proceeds to step S803 when the logarithmic graph display is chosen, or proceeds to step S804 when the linear graph display is chosen.

In step S803, the control circuit generates a WFM logarithmic graph waveform image and proceeds to step S805. When an object is shot as shown in FIG. 4A, the WFM logarithmic graph waveform image is the one shown in FIG. 4B. In step S804, the control circuit generates a WFM linear graph waveform image and proceeds to step S805. When an object is shot as shown in FIG. 4A, the WFM linear graph waveform image is the one shown in FIG. 4C. It should be noted that in steps S803 and S804, one WFM image is generated for each one input image.

In step S805, the control circuit chooses either to display the WFM image including only the luminance component, or to display the WFM image in which the luminance component and the color difference components are arranged side by side. The control circuit proceeds to step S807 when the control circuit chooses to display only the luminance component, or proceeds to step S806 when the control circuit chooses to display the WFM image in which the luminance component and the color difference components are arranged side by side.

In step S807, the control circuit displays, for example, the image shown in FIG. 4D when the logarithmic graph waveform image is generated, or displays, for example, the image shown in FIG. 4E when the linear graph waveform image is generated, and proceeds to step S808. In step S806, the control circuit displays, for example, an image shown in FIG. 9, and proceeds to step S808. FIG. 9 shows an example of the WFM image displayed in step S806 and is a diagram showing an image in which the input image of FIG. 4A, the WFM image of FIG. 4B, and the WFM image of the color difference components are superimposed. When superimposing the images, it is possible to make the shot image diaphanous by varying transmittance of the WFM image as shown in the image of FIG. 4F. It is also possible that part of the generated WFM image is extracted and displayed.

In step S808, the user adjusts the various settings for shooting, for example, makes exposure correction while having a look at the WFM image, and then the control circuit proceeds to step S809 and starts recording. The other configuration, operation, and advantages are similar to the configuration, operation, and functional effect of the above-described first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020346, filed Feb. 7, 2018, which is hereby incorporated by reference herein in its entirety.

What is claimed is:

1. An image processing apparatus comprising:
at least one processor or circuit configured to execute a plurality of tasks, including:
an acquiring task that acquires a luminance component of an input image;
a converting task that converts the luminance component acquired by the acquiring task into a predetermined luminance value for each pixel;
a generating task that generates a graph waveform image that shows a graph showing a relationship between a distribution of the luminance values obtained through the conversion by the converting task and pixel locations in the input image; and
a display controlling task that displays the graph waveform image generated by the generator on a display apparatus, wherein, in a case where the input image is recorded in a first mode, the generated graph waveform image is a logarithmic graph waveform image showing the distribution of the luminance values along one axis, among a vertical axis and a horizontal axis, which is a logarithmic axis representing the luminance values in the graph, and the other axis, among the vertical axis and the horizontal axis, representing the pixel locations in the input image.

2. The image processing apparatus according to claim 1, wherein, in a case where the input image is recorded in a second mode, the graph waveform image is a linear graph waveform image showing the distribution of the luminance values along the one axis, which is a linear axis representing the luminance values in the graph and the other axis representing the pixel locations in the input image.

3. The image processing apparatus according to claim 1, wherein the display controlling task displays the input image and the logarithmic graph waveform image together on the display apparatus.

4. The image processing apparatus according to claim 2, wherein, in a case where the input image is recorded in the first mode:
the generating task generates both the logarithmic graph waveform image and the linear graph waveform image, and
the display controlling task displays the logarithmic graph waveform image and the linear graph waveform image generated by the generating task together on the display apparatus.

5. The image processing apparatus according to claim 4, wherein the display controlling task displays the input image, the logarithmic graph waveform image, and the linear graph waveform image together on the display apparatus.

6. The image processing apparatus according to claim 1, wherein in a case where the input image is recorded in the first mode:
the generating task further generates a linear graph waveform image, with the one axis being a linear axis representing the luminance values in the graph, showing a distribution of luminance values smaller than a predetermined value among the luminance values, and the other axis representing the pixel locations in the input image; and
the display controlling task further displays the linear graph waveform image generated by the generating task on the display apparatus.

7. The image processing apparatus according to claim 6, wherein the display controlling task displays the logarithmic graph waveform image and the linear graph waveform image together on the display apparatus.

8. The image processing apparatus according to claim 1, wherein the graph waveform image includes a vertical axis representing the luminance values and a horizontal axis representing a location of each pixel in the input image in a horizontal direction of the input image.

9. The image processing apparatus according to claim 2, wherein the first mode is a mode in which the input image is recorded in HDR (High Dynamic Range), and the second mode is a mode in which the input image is not recorded in HDR (High Dynamic Range).

10. The image processing apparatus according to claim 2, wherein a maximum value of the luminance values for the input image recorded in the first mode is larger than a maximum value of the luminance values for the input image recorded in the second mode.

11. A method of controlling an image processing apparatus using comprising at least one processor thereof, the method comprising:
acquiring a luminance component of an input image;
converting the acquired luminance component into a predetermined luminance value for each pixel;
generating a graph waveform image that shows a graph showing a relationship between a distribution of the luminance values obtained through the conversion of the acquired luminance component and pixel locations in the input image; and
displaying the generated graph waveform image on a display apparatus, wherein, in a case where the input image is recorded in a first mode the generated graph waveform image is a logarithmic graph waveform image showing the distribution of the luminance values along one axis, among a vertical axis and a horizontal axis, which is a logarithmic axis representing the luminance values in the graph, and the other axis, among the vertical axis and the horizontal axis, representing the pixel locations in the input image.

12. A non-transitory computer-readable storage medium storing a program executable by a computer to execute a method comprising:
acquiring a luminance component of an input image;
converting the acquired luminance component into a predetermined luminance value for each pixel;
generating a graph waveform image that shows a graph showing a relationship between a distribution of the luminance values obtained through the conversion of the acquired luminance component and pixel locations in the input image; and
displaying the generated graph waveform image on a display apparatus, wherein, in a case where the input image is recorded in a first mode the generated graph waveform image is a logarithmic graph waveform image showing the distribution of the luminance values along one axis, among a vertical axis and a horizontal axis, which is a logarithmic axis representing the luminance values in the graph, and the other axis, among the vertical axis and the horizontal axis, representing the pixel locations in the input image.

* * * * *